United States Patent
Rout et al.

(10) Patent No.: US 11,455,347 B2
(45) Date of Patent: Sep. 27, 2022

(54) DYNAMIC DETECTION OF CROSS-DOCUMENT ASSOCIATIONS

(71) Applicant: Optum Technology, Inc., Eden Prairie, MN (US)

(72) Inventors: Swapna Sourav Rout, Bangalore (IN); Sharlene L. Tan, Quezon (PH); Vamsi Bhandaru, Hyderabad (IN); Vineet Shukla, Bangalore (IN); Akshaya D. N, Tiptur (IN); Kartik Chaudhary, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 33 days.

(21) Appl. No.: 17/015,511

(22) Filed: Sep. 9, 2020

(65) Prior Publication Data

US 2022/0075831 A1   Mar. 10, 2022

(51) Int. Cl.
| | | |
|---|---|---|
| *G06F 16/93* | (2019.01) | |
| *G06N 5/04* | (2006.01) | |
| *G06N 20/00* | (2019.01) | |
| *G06F 16/2457* | (2019.01) | |

(52) U.S. Cl.
CPC ........ *G06F 16/93* (2019.01); *G06F 16/24578* (2019.01); *G06N 5/04* (2013.01); *G06N 20/00* (2019.01)

(58) Field of Classification Search
CPC .......... G06N 20/00; G06N 5/04; G06N 20/10; G06F 16/93; G06F 16/24578
See application file for complete search history.

(56) References Cited

U.S. PATENT DOCUMENTS

| 8,423,385 B2 | 4/2013 | Radoccia et al. |
| 9,501,624 B2 | 11/2016 | Sturgeon et al. |
| 10,275,576 B2 | 4/2019 | Furst et al. |
| 2011/0257992 A1 | 10/2011 | Scantlant et al. |
| 2016/0292456 A1 | 10/2016 | Dubey et al. |
| 2019/0378618 A1 | 12/2019 | Lieberman |
| 2020/0075166 A1 | 3/2020 | Gleason |
| 2020/0143946 A1 | 5/2020 | Lewis |
| 2021/0357440 A1* | 11/2021 | Shankaranarayana ....... G06F 16/367 |

OTHER PUBLICATIONS

Software Engineering Stack Exchange, https://web.archive.org/web/20161114180315/https://softwareengineering.stackexchange.com/questions/9881/what-should-i-include-in-my-class-documentation-header (Year: 2016).*

(Continued)

*Primary Examiner* — Hau H Hoang
(74) *Attorney, Agent, or Firm* — Alston & Bird LLP

(57) ABSTRACT

Systems and methods are configured to generate a set of related document objects for a predictive entity and/or to generate an optimal document sequence for a set of related document objects. In one embodiment, a set of related document objects for a predictive entity is generated by processing entity metadata features associated with the predictive entity using an entity-document correlation machine learning model, and an optimal document sequence is generated for the set of related document objects by processing the set of related document objects using a document sequence optimization machine learning model.

20 Claims, 11 Drawing Sheets

(56) References Cited

OTHER PUBLICATIONS

"Findings From the Evaluation of E-Prescribing Pilot Sites—Interim Report," U.S. Department of Health and Human Services, Agency for Healthcare Research and Quality, Publication No. 07-0047-EF, Apr. 2007, (128 pages). [Retrieved from the Internet Nov. 30, 2020] <URL: http://bok.ahima.org/PdfView?oid=70557>.

"Next Gen RCM," Triple Tree Industry Perspective, Q4'18, (2018), (56 pages). [Retrieved from the Internet Nov. 30, 2020] <URL: https://www.triple-tree.com/TripleTree/media/Research/TripleTree-RCM.pdf>.

Degala, Sarath. "The Future is Now: Two Exciting Advances in Healthcare AI," Becker's Health IT, Mar. 27, 2018, (9 pages). [Article, Online]. [Retrieved From the Internet Nov. 30, 2020] <URL: https://www.beckershospitalreview.com/healthcare-information-technology/the-future-is-now-two-exciting-advances-in-healthcare-ai.html>.

Matheny, Michael et al. "Artificial Intelligence in Health Care: The Hope, The Hype, The Promise, The Peril," National Academy of Medicine, The Learning Health System Series, (269 pages). [Retrieved from the Internet Nov. 30, 2020] <URL: https://nam.edu/wp-content/uploads/2019/12/AI-in-Health-Care-PREPUB-FINAL.pdf>.

Rajkomar, Alvin et al. "Machine Learning in Medicine," New England Journal of Medicine, Apr. 4, 2019, vol. 380, No. 14, pp. 1347-1358. doi: 10.1056/NEJMra1814259.

\* cited by examiner

DYNAMIC DETECTION OF CROSS-DOCUMENT ASSOCIATIONS

BACKGROUND

Embodiments of the present invention generally relate to improving document retrieval efficiency and/or document retrieval reliability in document management systems.

BRIEF SUMMARY

In general, embodiments of the present disclosure provide methods, apparatus, systems, computing devices, computing entities, and/or the like for generating a subset of related document objects for a predictive entity. In various embodiments, a set of entity metadata features associated with the predictive entity instance of the predictive entity is identified and processed using an entity-document correlation machine learning model to identify a subset of related document objects for the predictive entity instance from a set of reference document objects.

In particular embodiments, the entity-document correlation machine learning model is configured at least in part based on a set of inferred annotative relationships between a set of input index document objects and the set of reference document objects. In some embodiments, each inferred annotative relationship is associated with a corresponding input index document object and describes a related reference document subset of the set of reference document objects for the corresponding input index document object. In addition, the set of entity metadata features associated with the predictive entity instance of the predictive entity may include at least one of one or more demographic features, one or more diagnostic features, and one or more policy-related features. Accordingly, one or more actions may be performed based on the subset of related document objects identified by the model.

In various embodiments, the entity-document correlation machine learning model is developed based on the related reference document subset and a set of input index document metadata features determined for each input index document object of the set of input index document objects. In some embodiments, the related reference document subset for an input index document object may be identified by processing the input index document object using a cross-document annotation machine learning model based on a set of prior annotative relationships between a set of prior index document objects and a set of prior reference document objects.

In addition, in some embodiments, the entity-document correlation machine learning model is configured to generate a related document sequence for the subset of related document objects that defines a related document ordering value for each related document object in the subset of related document objects. Accordingly, in these embodiments, each inferred annotative relationship may define a related reference document sequence for the related reference document subset that is associated with the inferred annotative relationship. This related reference document sequence defines a reference document ordering value for each related reference document in the related reference document subset and can be used to train the entity-document correlation machine learning model to generate the related document sequence.

Further, in some embodiments, each inferred annotative relationship may describe one or more cross-document annotations. In some embodiments, each cross-document annotation may be associated with a corresponding text segment of one or more text segment associated with the corresponding input index document object, and the one or more text segments may be associated with a text segment order. In particular embodiments, the related reference document sequence defined by the inferred annotative relationship may be determined based on the text segment order.

Furthermore, embodiments of the present disclosure provide methods, apparatus, systems, computing devices, computing entities, and/or the like for generating an optimal document sequence for a set of input document objects. In various embodiments, a set of sequence-related features is determined for each input document object in the set of input document objects and processed using a document sequence optimization machine learning model to generate the optimal document sequence. For instance, depending on the embodiment, the set of sequence-related features for an input document object may include at least one of a document identifier of the input document object, a document creation date identifier of the input document object, a document latest revision date identifier of the input document object, and the like.

In particular embodiment, the document sequence optimization machine learning model is configured to generate a set of candidate document sequences for the set of input document objects, generate a combined sequence probability value for each candidate document sequence of the set of candidate document sequences based on a plurality of pair-wise document sequencing probabilities associated with the set of input document objects, and select the optimal document sequence from the set of candidate document sequences based on the combined sequence probability values. Accordingly, one or more actions may be performed based on the optimal document sequence generated by the model.

In some embodiments, each pair-wise document sequencing probability is associated with an ordered document pair of a plurality of ordered document pairs of the set of input document objects. In some embodiments, each ordered document pair of the plurality of ordered document pairs may be associated with one or more prior document objects of the set of input document objects and a posterior document object of the set of input document objects. Accordingly, each pair-wise document sequencing probability describes an estimated probability that the one or more prior document objects in the ordered document pair for the pair-wise document sequencing probability is immediately followed by the posterior document object in the ordered document pair for the pair-wise document sequencing probability.

In addition, in some embodiments, the set of related document objects are associated with a prior document sequence and the document sequence optimization machine learning model is configured to generate the combined sequence probability value for a corresponding candidate document sequence that corresponds to the prior document sequence by generating a raw combined sequence probability value for the corresponding candidate document sequence and applying a prior selection bonus to the raw combined sequence probability value. Finally, in some embodiments, the plurality of pair-wise document sequencing probabilities may be determined based on historical user activity data associated with a corpus of monitored document objects.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
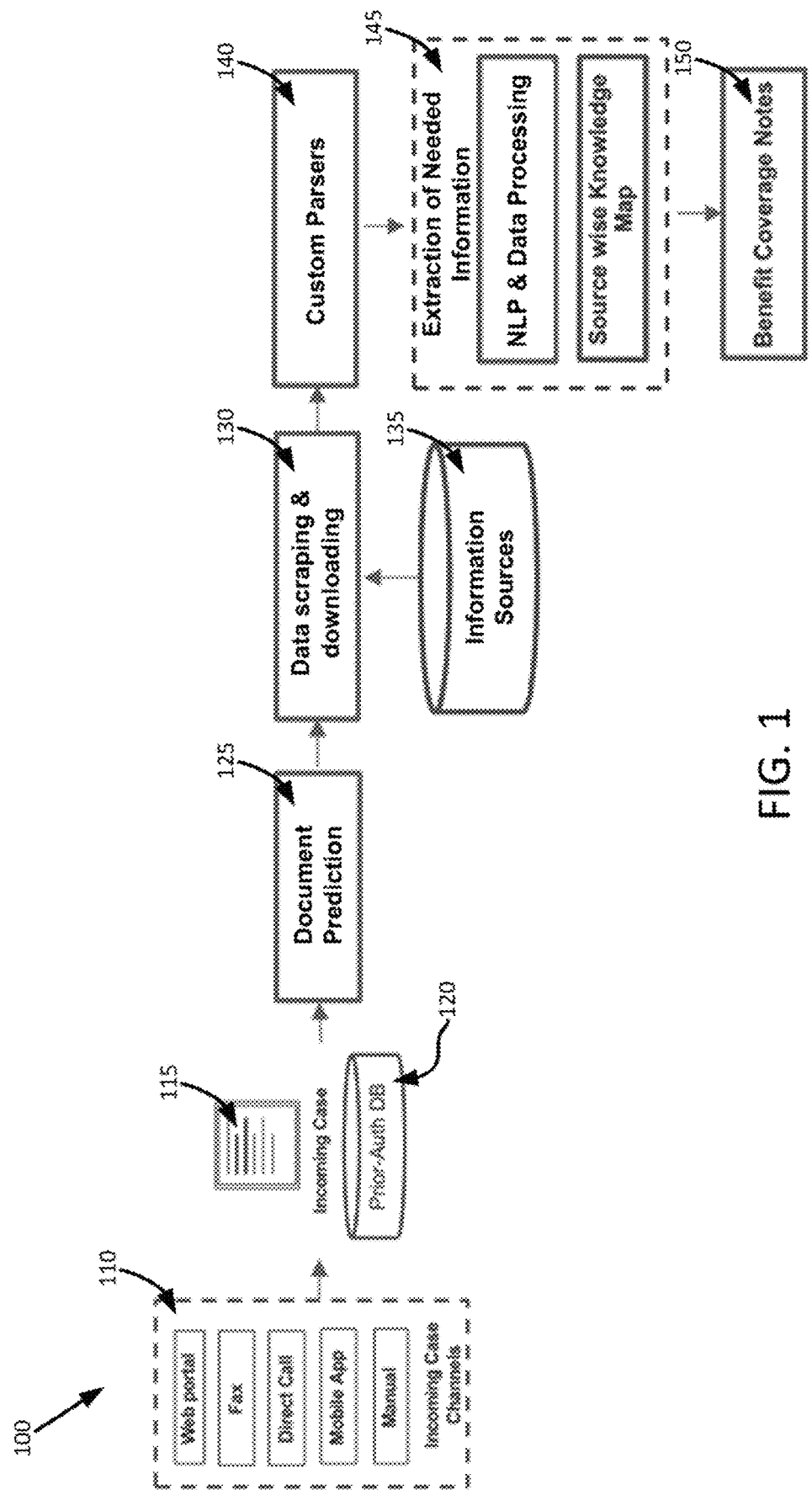
FIG. 1 is an overview of aggregating information from different documents according to various embodiments of the present disclosure.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "document object" may refer to a data object describing a collection of data items, such as a collection of text data items, a collection of image data items, and/or the like. Examples of document objects include Portable Document Format (PDF) files, Hyper-Text Markup Language (HTML) source files, Microsoft Word documents, image files, and/or the like. In some embodiments, document objects describe pre-authorization review guidelines, regulatory guidelines, knowledge libraries, standard operating procedure (SOP) guidelines, and/or the like.

The term "predictive entity" may refer to a data object associated with a set of related document objects, where detecting the correlation of the predictive entity with the set of related objects may be performed using an entity-document correlation machine learning model. For instance, an example that is used throughout the disclosure is investigating information from various information sources for use by a health insurance provider in adjudicating an incoming case for a member who is seeking pre-authorization for a particular set of one or more medical procedures and/or treatments. In some embodiments, the predictive entity may be a member identifier with respect to which the pre-authorization task may be performed. In the noted example, the predictive entity may provide initial information on the member as well as information on the occurrence of a medical procedure and/or medical treatment in relation to the member.

The term "entity metadata features" may refer to a data object that describes one or more features associated with a predictive entity that may be used in accordance with an entity-document correlation machine learning model to detect a set of related document objects for the predictive entity. For example, if the predictive entity is a member identifier, examples of entity metadata features include member diagnostic features, member policy-related features, and member demographic features. Examples of member diagnostic features include diagnosis codes associated with a member and Current Procedural Terminology (CPT) codes associated with a member. Examples of member policy-related features include set numbers, policy numbers, group numbers, and/or the like. Examples of member demographic features include member names and member identifier numbers.

The term "entity-document correlation machine learning model" may be refer to a data object that describes parameters and/or hyper-parameters of a machine learning model that is configured to identify a subset of related document objects for a predictive entity based on entity metadata features for the predictive entity. In some embodiments, in particular embodiments, the entity-document correlation machine learning model is generated at least in part using a set of inferred annotative relationships between a set of input index documents and a set of inferred reference documents. An example of an entity-document correlation machine learning model is a probabilistic deep learning model.

The term "index document object" may refer to a data object that describes a document object having a portion that is deemed to refer to a particular reference document object. For example, an index document object may represent a case note of summarized information referred to by a reviewer during a past case when a member was seeking pre-authorization for a particular medical procedure and/or treatment and a reference document object may represent an information source identified in the case note used by the reviewer in adjudicating the case. For example, if a text portion T1 of Document object D1 may be deemed to refer to Document object D2, document object D1 is deemed to be an index document object.

The term "reference document object" may refer a data object that describes a document object that is referred to by a portion of an index document object. Examples of reference document objects include pre-authorization review guidelines, regulatory guidelines, knowledge libraries, standard operating procedure (SOP) guidelines, and/or the like. For example, if a text portion T1 of Document object D1 is deemed to refer to Document object D2, document object D2 may be deemed to be a reference document object.

The term "inferred annotative relationship" may refer to a data object that describes an inferred relationship between a portion of an index document object and one or more related reference documents, where the inferred relationship may be detected using a cross-document annotation machine learning model. For example, a particular inferred annotative relationship may describe that a text portion T1 of Document object D1 is deemed to refer to Document object D2. As another example, a particular inferred annotative relationship may describe that a text portion T1 of Document object D1 is deemed to refer to Document object D2 and Document object D3.

The term "related reference document subset" may refer to a data object that describes one or more related reference documents for a corresponding portion of an index document in accordance with an inferred annotative relationship for the corresponding portion. For example, if a text portion T1 of Document object D1 is deemed to refer to Document object D2, the related reference document subset for T1 includes D2. As another example, if a text portion T1 of Document object D1 is deemed to refer to Document object D2 and Document object D3, the related reference document subset for T1 includes D2 and D3.

The term "related reference document sequence" may refer to a data object that describes an inferred sequence of the set of related document objects for a particular index document, where the inferred sequence defines an inferred ordering value for each related document object in the set of related document objects. For example, if a document object D1 includes a text portion T1 that includes before a text portion T2, and if T1 is deemed to refer to document object D2 while T2 is deemed to refer to document object D3, then the related reference document sequence for the document object D1 may describe that D2 has a lower ordering value relative to D3.

The term "cross-document annotation machine learning model" may refer to a data object that describes parameters and/or hyper-parameters of a machine learning model that is trained using a set of prior annotative relationships in order to, once trained, generate a set of inferred annotative relationships for an input document object. For example, a cross-document annotation machine learning model may be a supervised machine learning model that is configured to process a set of prior annotative relationships that include a set of manually-generated prior annotative relationships in order to generate a set of inferred annotative relationships that include a set of automatically-generated prior prior annotative machine learning models. In some embodiments, by utilizing a cross-document annotation machine learning model to generate training data for an entity-document correlation machine learning model, various embodiments of the present invention enable semi-supervised training of an entity-document correlation machine learning model.

The term "optimal document sequence" may refer to a data object that describes an optimal ordering of a set of related document objects associated with an input document object, where the optimal ordering assigns an optimal ordering value to each related document object in the set of related document objects, and where the optimal ordering is determined by processing the set of related document objects using a document sequence optimization machine learning model. For instance, the optimal document sequence in particular embodiments may indicate an ordering of a set of document objects with respect to their use by a reviewer agent during performance of a processing task (e.g., a pre-authorization task) associated with the predictive entity.

The term "sequence-related features" may refer to a data object that describes one or more features for each document object in a set of related document objects for a corresponding input document object that may be used in identifying the optimal document sequence for the input document object. In some embodiments, sequence-related features describe information and/or characteristics of document objects found in the set of related document objects for an input document object. Examples of sequence-related features include document identifiers, document-type identifiers, document creation date identifiers, document latest revision date identifiers, and/or the like.

The term "document sequence optimization machine learning model" may refer to a data object that describes parameters and/or hyper-parameters of a machine learning model that processes a related set of document objects for an input document object to generate the optimal document sequence for the input document object. For instance, in particular embodiments, the document sequence optimization machine learning model may be configured to generate a set of candidate document sequences for a set of input document objects, generate a combined sequence probability value for each candidate document sequence of the set of candidate document sequences, and select the candidate document sequence with the highest combined sequence probability value as the optimal document sequence. In some embodiments, the term "candidate document sequence" may refer to a candidate sequential ordering of the document objects found in the set of document objects. For example, given a set of related document objects that include a document object D1 and a document object D2, the following candidate document sequences may be identified: a candidate document sequence D1→D2 and a candidate document sequence D2→D1.

The term "combined sequence probability value" may refer to a data object that describes an overall likelihood that a particular candidate document sequence is the optimal sequential ordering of the set of related document objects for a corresponding input document object. In some embodiments, given a candidate document sequence D1→D2→ ... →$D_n$, the combined sequence probability value for the candidate document sequence may be calculated by computing $\pi_{i=1}^{n} P(D_i | D_{i-1}, D_{i-2}, \ldots, D_1)$.

The term "prior selection bonus" may refer to a data object that describes a value that is configured to be added to the combined sequence probability value for a particular candidate document sequence, where the value is determined based on frequency of past selection of the particular candidate document sequence as an optimal document sequence. For example, in some embodiments, application of a prior selection bonus to the combined sequence probability value for a particular candidate document sequence may be configured to reward a repeat selection of the particular candidate document sequence because the particular candidate document sequence is known to have been selected for a past pre-authorization case, where the value is determined based on frequency of past selection of the particular candidate document sequence as an optimal document sequence.

Overview

Many processes found throughout a number of different industries are required to gather and analyse relevant data from a number of different data sources. Oftentimes these sources may involve various entities both internal and external to an organization and may take various forms such as files, repositories, databases, websites, systems, services, and the like. For example, many health insurance providers use a pre-authorization process with respect to customers (e.g., members) who are seeking pre-authorization for a medical procedure and/or treatment. The pre-authorization process is typically carried out by an employee (e.g., a reviewer) who gathers and analyses information with respect to the pre-authorization to determine whether to provide authorization for the medical procedure and/or treatment. This information may pertain specifically to the customer such as the insurance policy that customer currently carries as well as demographics on the customer, or more generally to aspects of the pre-authorization process such as general guidelines, state and federal mandates, general information on the medical procedure and/or treatment, and the like. This information may need to be gathered from several different sources as well as need to be gathered in a particular sequential order since certain information that is gathered can then be used to gather and/or analyse further information used in the process.

As a result, the pre-authorization process employed by many health insurance providers can serve as a bottleneck because of the time involved in performing the process and many customers may have to wait a considerable amount of time to receive authorization for a particular medical procedure and/or treatment. This wait can oftentimes be problematic when the medical procedure and/or treatment may be urgent. Furthermore, the bottleneck can lead to many inefficiencies with respect to the health insurance provider's limited resources such as personnel who are required to perform the process and/or systems that are required to gather the information from the different sources.

Processes in other industries may experience the same bottleneck due to having to obtain and analyse information from a number of different sources. For example, an Internet service provider may have an extensive network system used in providing Internet service to its customers. In some embodiments, the network system may involve various servers, routers, and other components that are located over a large area. The Internet service provider may have a troubleshooting process for troubleshooting issues that occur within the network system. Accordingly, this process may involve gathering and analysing information from certain components within the network system when an issue occurs as well as information from various sources that provides documentation on addressing the issue. In addition, this information may need to be gathered and/or analysed in a particular sequential order. For example, information on Quality-of-Service may need to be initially gathered and analysed to identify a particular component (e.g., a router) within the system network having a problem. Information may then need to be gathered and analysed from the component to identify the specific issue. From there, further information may need to be gathered and analysed from various technical manuals to identify an approach to address the issue, all of which can take a considerable amount of time resulting in a bottleneck in restoring Internet service to its customers.

This may still be the case even in instances in which the troubleshooting process is being carried out by automation (e.g., artificial intelligence) instead of a human. The troubleshooting system is still required to gather and analyse the information from the different sources in a sequential manner to resolve the issue. Although the troubleshooting system may be able to identify and resolve the issue faster than a human, the troubleshooting process carried out by the troubleshooting system can still lead to a time delay in restoring Internet service to customers that is considered unacceptable.

Thus, embodiments of the present invention provide concepts for replacing the existing processes of aggregating (e.g., gathering and analyzing) information from different sources that is oftentimes manually-driven with an improved automated process. In various embodiments, a machine-learning model is used in identifying a set of document objects representing different sources having information that is needed in performing a certain process and/or task. In addition, an optimal document sequence may be identified for the set of document objects that provides an optimized ordering of the document objects found in the set for use in performing the process and/or task. Accordingly, in particular embodiments, a machine-learning model may be used in identifying the optimal document sequence for the set of documents. The information needed from each of the sources identified by the document objects may then be retrieved and provided in a consolidated form according to the optimal document sequence. This consolidated form may then be used in performing the process and/or task.

The disclosed solution provided herein is more effective, accurate, and faster than aggregating information from different sources performed by a human and aggregating information from different sources performed by automated processes. Further, the deterministic prioritization rules, probabilistic prioritization rules, and machine learning model(s) can carry out complex mathematical operations that cannot be performed by the human mind (e.g., determining a likelihood of documents being needed for a specific process and/or task). Especially when such operations need to be performed in a short timeframe. In doing so, various embodiments of the present disclosure make major technical contributions to improving the efficiency and reliability of existing processes for aggregating information from different sources.

An exemplary overview is now provided to demonstrate various embodiments of the disclosure provided herein for aggregating information from various information sources to be used with respect to a predictive entity. An example of such an entity is now introduced that is used throughout the remainder of the disclosure to assist the reader's understanding of various embodiments of the disclosure. It should be understood that this example is provided for the purpose of facilitating the reader's understanding of embodiments and should not be interpreted to limit the scope of disclosure.

The example involves using various embodiments in aggregating information from various information sources to be used in a pre-authorization process performed by a health insurance provider for adjudicating cases in which members are seeking pre-authorization for various medical procedures and/or treatments. The purpose of the process is to ensure the medical procedures and/or treatments are properly covered under the members' insurance policies and to what extent they are covered. In some embodiments, a reviewer who is employed by the health insurance provider performs the pre-authorization process upon receiving a request for a member who is seeking authorization for a particular medical procedure and/or treatment (instance).

FIG. 1 an overview of a process 100 for aggregating information from different sources to be used for the incoming case is provided that makes use of various embodiments of the disclosure. Accordingly, the request is treated as a new incoming case that can be received over a multitude of different channels 110 such as, for example, a web portal, a fax, a mobile application, manually, through a phone call, and the like. Therefore, the case 115 is captured in the health insurance provider's system and the initial information provided along with the case 115 may be checked to ensure the minimal amount of information is present to begin the pre-authorization process. For example, the minimum amount of information necessary to begin the process may include identification information for the member, CPT and diagnosis codes, and the place of service for the medical procedure and/or treatment. In addition, case enrichment may occur that involves supplementing the initial information from information from various sources 120 such as databases and/or repositories to ready the case for successful adjudication.

At this point, a document prediction process 125 is performed to predict a subset of related document objects that represent sources having information needed during the pre-authorization process so that the reviewer can successfully adjudicate the case. In some instances, the document prediction process 125 may also provide a related document sequence providing an order in which the document objects found in the subset are to be processed. In some embodiments, in particular embodiments, an entity-document correlation machine-learning model is used to identify the subset of related document objects in which various information associated with the case may be used as input to the model. As discussed further herein, depending on the embodiment, this machine-learning model may be configured simply to provide the subset of related document objects or may be configured to provide the subset identified with the related document sequence.

Further, the document prediction process 125 in particular embodiments may include a document sequence optimization machine-learning model that orders the set of document objects in an optimal document sequence. In some embodiments, the ordering may be "optimized" so that the document objects are provided in a particular sequence with respect to when information from the sources represented by the document objects is needed during the pre-authorization process. That is to say, the optimal document sequence identifies an order for the set of document objects so that information found in each of the sources identified by the document objects is available to the reviewer when needed to conduct a successful adjudication of the case.

Once the set of document objects have been identified, the process 100 continues in various embodiments with data scraping and downloading 130 each of the information sources identified in the set of document objects as required. This step in the process may involve downloading and processing different types of information sources 135 such as, for example, pdf files, scanned images, scanned pdf files, word processing documents, repositories, databases, HTML source files, websites and the like.

In some embodiments, the information sources may be divided into two categories. A first category of information sources may involve sources having generic information that is not necessarily specific to the particular case. For example, generic information may involve state and federal health mandates and/or standard operating procedures. These generic sources may be downloaded, parsed, and stored in some type of repository so that their retrieval is centralized and streamlined. In addition, these generic sources may be updated on a periodic basis (e.g., weekly) so that any changes to the information found in the sources may be updated in the repository.

The second category of information sources is member specific sources. These are considered information sources holding information that is specific to the particular member involved in the case. For example, records providing information on past medical examines conducted on the member and/or records on previous insurance claims submitted by the member. Accordingly, these documents are downloaded in real-time in various embodiments as the pre-authorization process is taking place.

Once the information sources have been obtained, information found in one or more of the sources may be parsed. In some embodiments, in particular embodiments, one or more custom parsers 140 may be utilized to perform this operation. For instance, an Optimal Character Recognition (OCR) based parser may be used to parse information found in images. For example, downloaded pdf files may be converted into images and given as input to the OCR based parser. In addition, other parsers may be utilized such as an XML based parser, HTML based parser, word processing based parser, and the like in parsing information from different information sources. Accordingly, in particular embodiments, the result of the parsing process is a dictionary for each information source containing all the information downloaded and parsed from the source.

The process 100 then continues in various embodiments with extracting the needed information 145 from the dictionaries for the various sources. In some embodiments, in particular embodiments, the information found in the dictionary for each source is passed through a Natural Language Processing (NLP) pipeline to extract named entities and their corresponding context found in each source. Thus, Named-Entity Recognition (NER) may be used in embodiments to identify, locate, and classify named entities mentioned in the information into pre-defined categories. In addition, corresponding sections of the information (e.g., paragraphs) may also be identified/mapped in the process.

At this point, the named entities found in each of the sources can be mapped to a knowledge map. In generally, a knowledge map is a diagram that depicts relationships between pieces of knowledge (e.g., subjects). Typically, a knowledge map represents the pieces of knowledge connected with labeled links (e.g., arrows) in a hierarchical structure with the relationships between the pieces of knowledge articulated in linking phrases. Therefore, as discussed in further detail herein, a source-specific knowledge tree may be constructed in particular embodiments for each source based on annotations provided by experts on past information gathered from the source.

Accordingly, specific queries to extract relevant sections of the information found in the dictionary for each source can be constructed based on an inference performed on the corresponding knowledge map for the document to find the entities for which the relevant sections of the information found in the dictionary should be extracted. For instance, in the example, the correct relationships can be selected form the knowledge map for a particular source containing information on policy related to certain treatments based on the policy related and treatment related details found in the map. These relationships are parsed to get the list of entities for which relevant sections of the source are to be extracted.

Finally, the relevant sections of information for each of the source is extracted from the corresponding dictionary based on the entities identified from the knowledge tree and combined to form an aggregate containing all the relevant information from all of the documents. Thus, returning the example, the relevant information may be combined into a benefits coverage case note 150 that can then be used by the reviewer in adjudicating the pre-authorization case.

As a result, all of the relevant information needed by the reviewer in performing the pre-authorization process is now found in a single document (the case note 150) so that the reviewer is not required to gather the needed information on his or her own. In addition, in particular embodiments, the information provided in the case note 150 is the sequential manner as identified earlier in the process 100. Therefore, the information can be found in the case note 150 in the order needed by reviewer in adjudicating the pre-authorization case 115 in a timely fashion.

Exemplary Technical Contributions

Various embodiments of the present invention provide techniques configured to increase efficiency and reliability of document retrieval in document management systems. Large document management systems with a large repository of documents incur substantial costs associated with end-user attempts to detect and browse related documents. For example, when performing a particular task, an end user may need to retrieve a set of documents related to the noted task. In doing so, the end user may need to perform computationally expensive operations to search for target documents, browse candidate documents to determine whether they provide the relevant information, and download documents of interest. Various embodiments of the present invention enable reducing such computational costs associated with retrieval of target documents by intelligently inferring annotative/subject-matter-based relationships across documents using entity-document correlation machine learning models and/or by intelligently inferring sequential/presentation-related relationships between documents using document sequence optimizing machine learning models. In doing so, various embodiments of the present invention make important technical contribution to increasing efficiency and reliability of document retrieval in document management systems and substantially improve the field of distributed document retrieval in distributed document server systems.

Exemplary use cases for various embodiments of the present invention are described below. For example, many processes carried out in various industries involve the use of data that is gathered from different sources. For example, in the health insurance industry, many medical procedures and/or treatments require a member to first seek pre-authorization from his or her health insurance provider before having the procedure and/or receiving the treatment. This is done to ensure the member has the correct insurance coverage for the procedure and/or treatment. The pre-authorization process generally involves an individual (e.g., a reviewer) gathering information typically from a plethora of sources to review the case and determine whether or not to provide authorization. For example, the reviewer may be required to review guidelines, state and/or federal mandates, and/or Current Procedural Terminology (CPT) code-based standard operating procedure documents. Accordingly, this information may involve a number of different sources such as different repositories, websites, libraries, databases, etc.

Thus, a reviewer who is investigating a single prior-authorization case for a health insurance provider may have to access and navigate several different sources manually to find needed information. This navigation process is time-consuming as the reviewer is oftentimes required to toggle between different sources. In addition, many of the sources have a considerable amount of information that the reviewer is then required to search through to find what he or she needs for the case, which adds more time to the pre-authorization process. Further, the sources typically need be analyzed in a particular order (e.g., sequentially) because information extracted from one source may be needed to analyze another source, all of which adds even more time to the pre-authorization process. As a result, the pre-authorization process practiced by many health insurance providers results in a huge bottleneck in providing their customers with timely service. In addition, the pre-authorization process results in many inefficiencies with respect to use of resources such as personnel and processing systems needed to carry out the process.

The same is true with respect to other processes carried out in other industries involving the gathering and analyzing of information from various sources. For example, troubleshooting processes used in many technology industries for identifying problems in computer systems and/or networks involve gathering and analyzing information from several different sources. For instance, a troubleshooting process used by an Internet service provider may involve gathering information from several different sources (e.g., servers, routers, and/or WiFi satellite) within the provider's network structure, as well as sources to aid in troubleshooting the problem (Quality-of-Service logs and/or technical manuals). In some embodiments, a technician who is working for the Internet service provider or analytics system (e.g., Artificial Intelligence) used by the provider may be required to access and analyze information from all these different sources to identify and correct a network problem. Again, the information may need to be analyzed in a particular order (e.g., sequentially). This can result in a huge bottleneck in correcting the problem in a timely manner. In addition, the troubleshooting process can result in many inefficiencies with respect to the use of resources such as the technician and/or analytics system needed to carry out the process.

Therefore, a need exists in the industry for improved systems and methods for aggregating information from various sources to aid in streamlining processes that make use of the information it is with respect to these considerations and others that, the disclosure herein is presented.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 2:
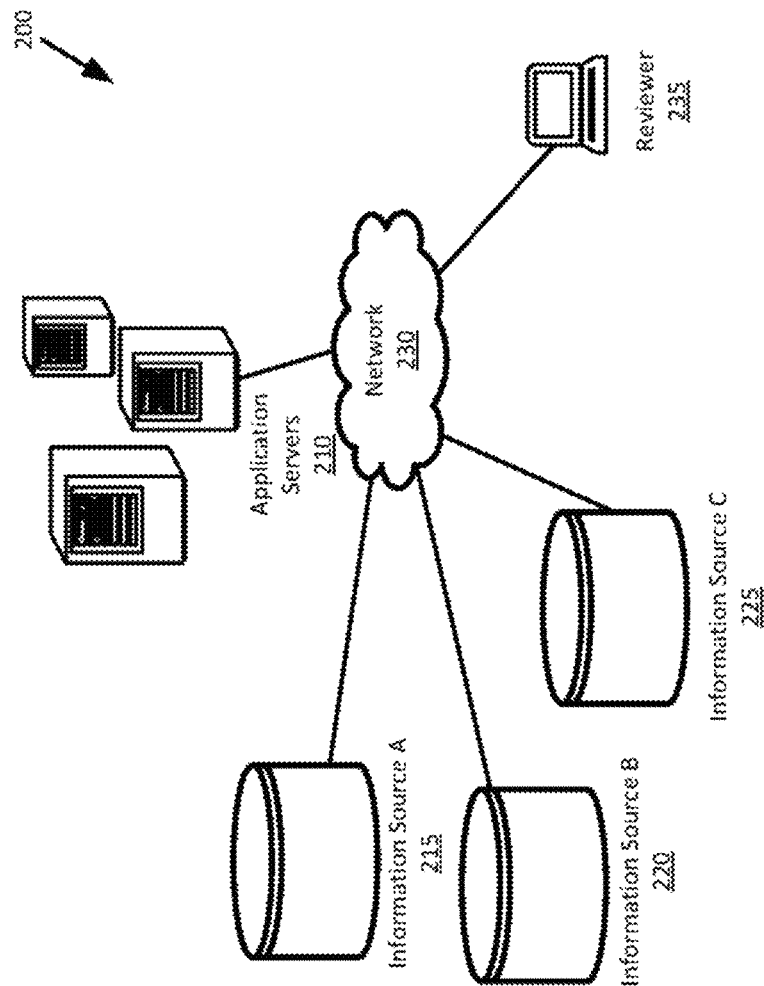
FIG. 2 is a diagram of a system architecture in accordance with various embodiments of the present disclosure.

FIG. 2 provides an illustration of a system architecture 200 that may be used in accordance with various embodiments of the disclosure. In some embodiments, the architecture 200 includes various components involved in aggregating information from various information sources that are to be used in performing a task. Accordingly, the components may include one or more application servers 210 that may be in communication with and one or more information sources 215, 220, 225 over one or more networks 230. It should be understood that the application server(s) 210 may be made up of several servers, storage media, layers, and/or other components, which may be chained or otherwise configured to interact and/or perform tasks. Specifically, the application server(s) 210 may include any appropriate hardware and/or software for interacting with the information sources 215, 220, 225 as needed to execute aspects of one or more applications for conducting processes that involve aggregating information found in the sources 215, 220, 225 and handling data access and business logic for such.

In addition, the architecture 200 may include one or more computing devices 235 used by individuals to conduct one or processes that make use of aggregated information. For example, the computing devices 235 may be used by reviewer(s) for a health insurance provider in conducting an analysis on pre-authorization cases. In some embodiments, the device(s) 235 may be one of many different types of devices such as, for example, a desktop or laptop computer or a mobile device such as a smart phone or tablet.

As noted, the application server(s) 210, information sources 215, 220, 225, and computing device(s) 235 may communicate with one another over one or more networks 230. Depending on the embodiment, these networks 230 may comprise any type of known network such as a land area network (LAN), wireless land area network (WLAN), wide area network (WAN), metropolitan area network (MAN), wireless communication network, the Internet, etc., or combination thereof. In addition, these networks 230 may comprise any combination of standard communication technologies and protocols. For example, communications may be carried over the networks 230 by link technologies such as Ethernet, 802.11, CDMA, 3G, 4G, or digital subscriber line (DSL). Further, the networks 230 may support a plurality of networking protocols, including the hypertext transfer protocol (HTTP), the transmission control protocol/internet protocol (TCP/IP), or the file transfer protocol (FTP), and the data transferred over the networks 230 may be encrypted using technologies such as, for example, transport layer security (TLS), secure sockets layer (SSL), and internet protocol security (IPsec). Those skilled in the art will recognize FIG. 2 represents but one possible configuration of a system architecture 200, and that variations are possible with respect to the protocols, facilities, components, technologies, and equipment used.

Exemplary Computing Entity

Figure 3:
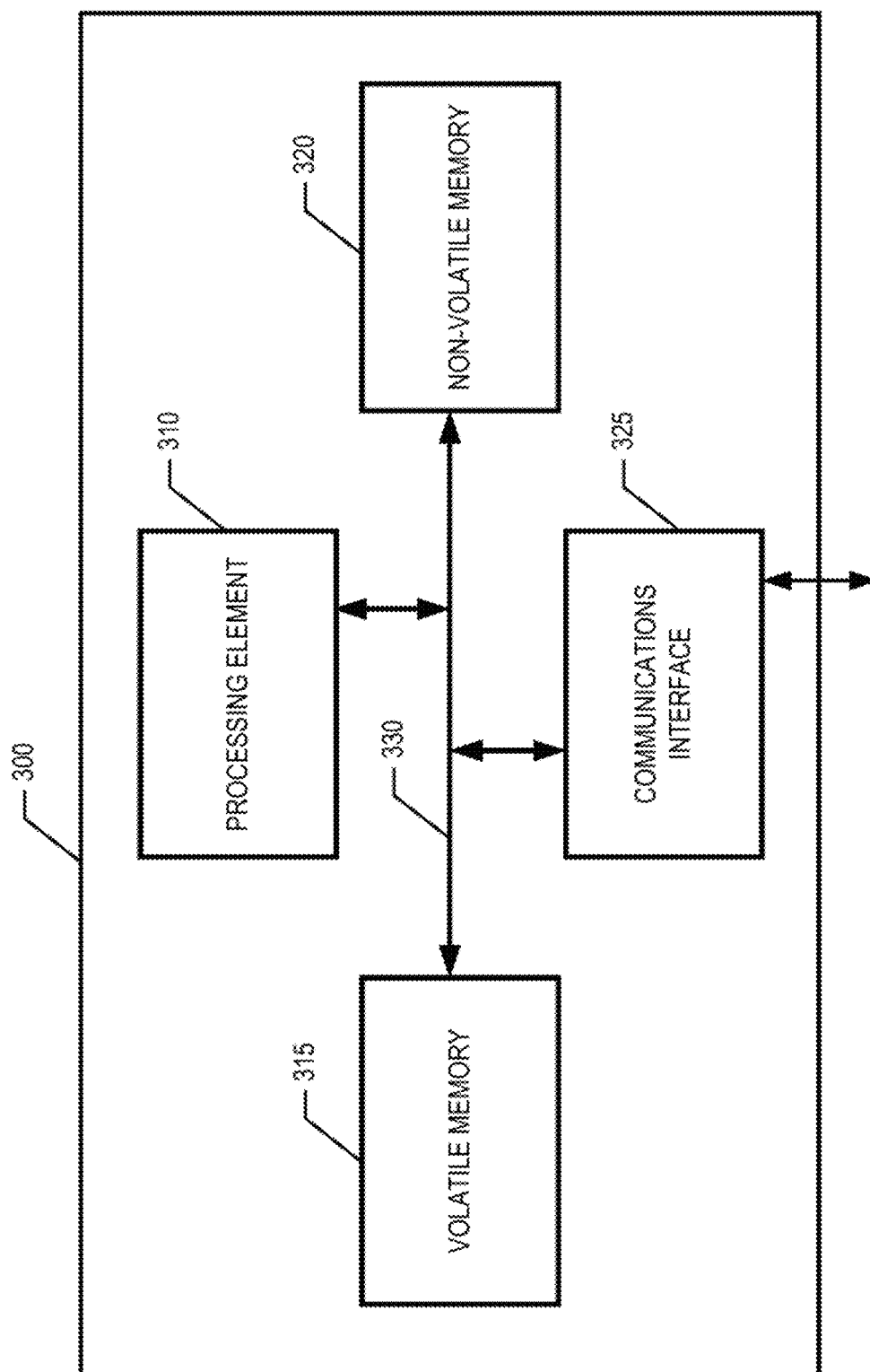
FIG. 3 is a schematic of a computing entity that can be used in accordance with various embodiments of the present disclosure.

FIG. 3 provides a schematic of a computing entity 300 that may be used in accordance with various embodiments of the present invention. For instance, the computing entity 300 may be one or more of the application servers 210 and/or devices 235 found in the system architecture 200 previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present invention when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use information sources 215, 220, 225 in which some or all the information/data required for various embodiments of the invention may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein. For example, an entity-document correlation machine learning model may be used without a document sequence optimization machine learning model, a document sequence optimization machine learning model without an entity-document correlation machine learning model, training data for training an entity-document correlation machine learning model may be generated without using a cross-document annotation machine learning model, and a cross-document annotation machine learning model may be used to generate training data for machine learning models other than an entity-document correlation machine learning model.

Predicting Document Sequences for Input Documents

As previously discussed, various embodiments of the invention may involve the use of one or more machine-learning models in identifying (e.g., predicting) a subset of related document objects identifying information sources needed in performing a task and in some instances, an optimal document sequence for the identified subset of related document objects. For instance, returning the example involving the pre-authorization process used within an health insurance provider, one or more machine-learning models may be used in identifying and sequencing a subset of related document objects needed by a reviewer in adjudicating a particular pre-authorization case for a medical procedure and/or treatment.

Figure 4:
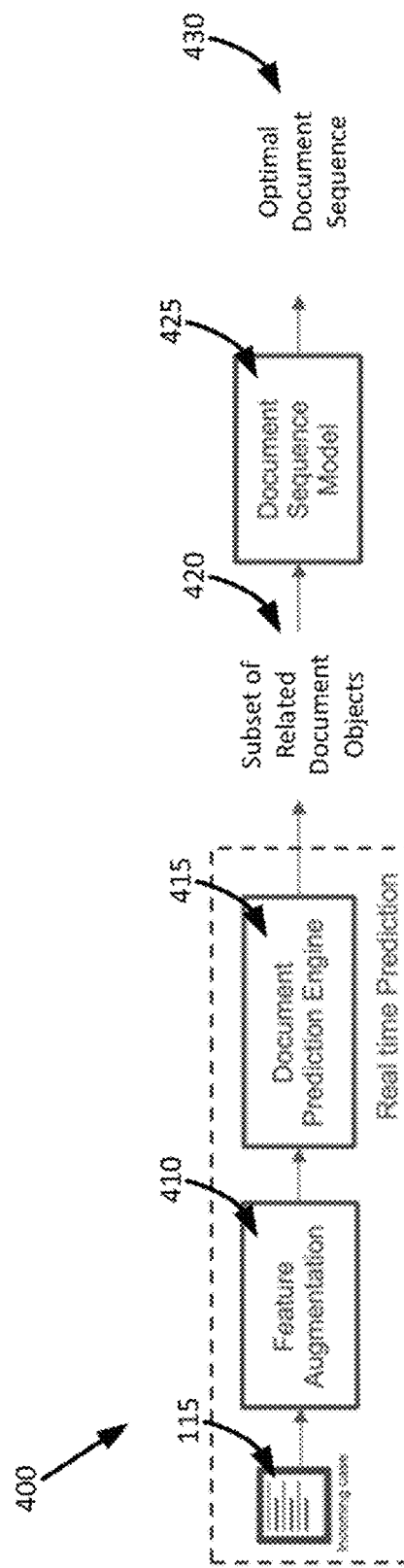
FIG. 4 is an overview of a process for identifying a sequence of documents in accordance with various embodiments of the present disclosure.

Turning now to FIG. 4, an overview of a process 400 for identifying a sequence of related document objects for an input document object is provided that makes use of machine-learning models in accordance with various embodiments of the disclosure. Again, the overview is discussed with respect to receiving an incoming case 115 involving a member seeking pre-authorization for a medical procedure and/or treatment from his or her health insurance provider. Therefore, as previously discussed, the pre-authorization case 115 may include initial information that is then supplemented with additional information from one or more information sources to augment the features 410 of the pre-authorization case 115 into entity metadata features. These features may then be read by a document prediction engine 415 that uses the features as input to an entity-document correlation machine-learning model that predicts a subset of related document objects 420 from a set of reference document objects, where the subset of related document objects 420 are deemed to be related to the pre-authorization case 115 and thus deemed needed by the reviewer in adjudicating the pre-authorization case 115.

In some embodiments, depending on the embodiment, the entity-document correlation machine learning model may be any one of many different types of machine-learning models. For instance, in particular embodiments, the entity-document correlation machine learning model may be a multi-label classification model that is configured to provide a probability with respect to each document object found in the set of reference document objects as to its likelihood the document object is needed by the reviewer during his or her review of the pre-authorization case 115. Therefore, any document object found to have a probability over a threshold value (e.g., over 0.05) may be identified by the document prediction engine 415 as being needed by the reviewer. It is noted that in some embodiments the entity-document correlation machine learning model may be a deep learning model such as a neural network configured to not only predict the subset of related document objects needed by the reviewer in adjudicating the pre-authorization case 115, but also to predict a related document sequence for the subset of document objects.

Figure 5:
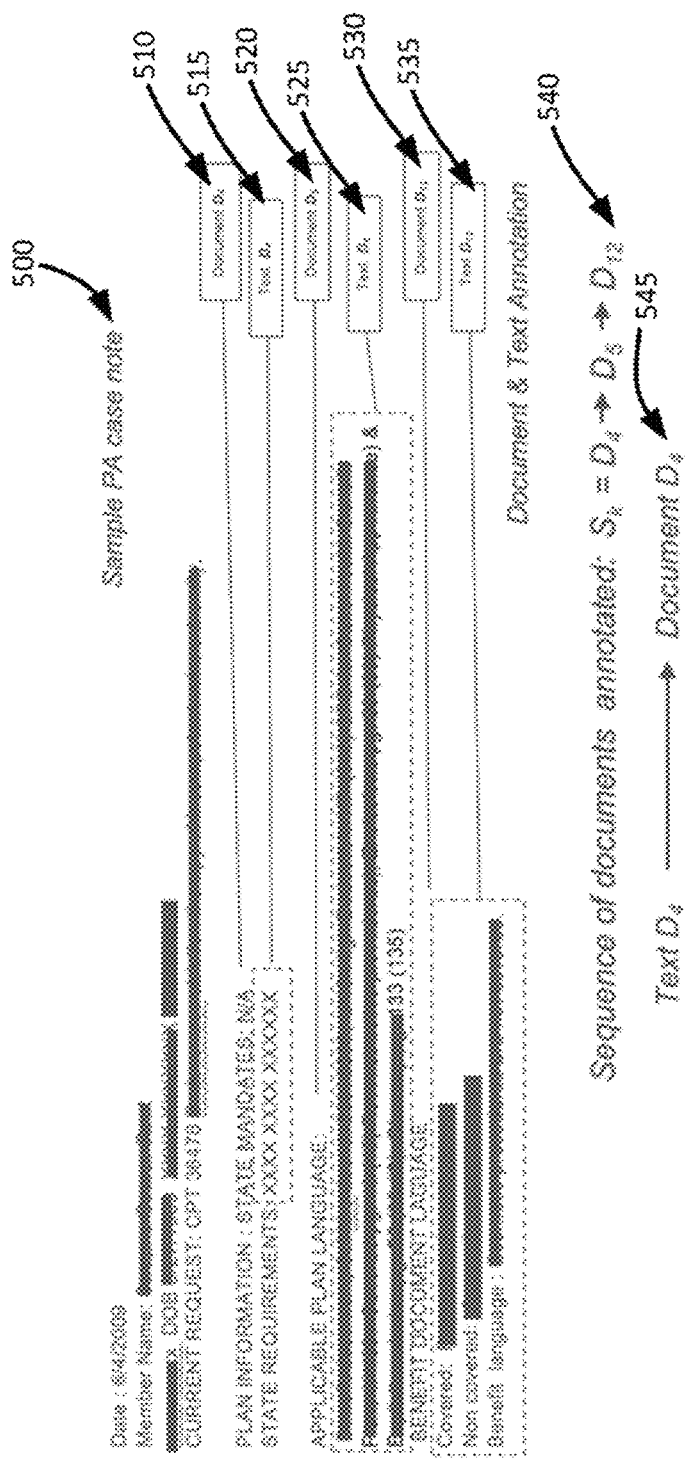
FIG. 5 is an example of an annotated document that can be used in accordance with various embodiments of the present disclosure.

In some embodiments, training data used in training the entity-document correlation machine learning model may be constructed in particular embodiments by manually annotating a corpus made up of previous index document objects (e.g., previous case notes 150) to identify the set reference document objects that were referenced by reviewers in adjudicating previous pre-authorization cases, what sections of information were used from the sources represented by the document objects, and/or the order (sequence) in which the information was referenced by the reviewers. For example, briefly turning to FIG. 5, a case note 500 for a previous pre-authorization is shown that has been annotated. In some embodiments, an annotation 510, 520, 530 has been added for each information source that was used by the reviewer in conducting the pre-authorization process to identify a related reference document subset. In addition, cross-document annotations 515, 525, 535 have been added identifying the sections of information (text) used from the sources.

In some embodiments, the information sources that make up the related reference document subset for the case note 500 are listed in a sequence in which they were used during the pre-authorization process. Thus, training data can be generated from these annotations 510, 520, 530 such as, for example, a related reference document sequence 540 for the related reference document subset, as well as the cross-document annotations 515, 525, 535 representing the information sections were used from (e.g., map to) the different document objects 545.

In addition, various document entity metadata features associated with the annotated case note 500 may be included along with the training data. For example, such features may include member demographic details such as name, member identifier, address, and the like, member policy details such as set number, policy number, and the like, and member diagnosis details such as diagnosis codes, CPT codes, and the like. Accordingly, these features may represent the initial information and/or augmented information gathered on the case when it was originally received. Thus, these features can be used as inputs and the related reference document subset and/or the related reference document sequence can be used as outputs in training the entity-document correlation machine learning model to recognize one or more inferred annotative relationships between the inputs and outputs.

In addition, a cross-document annotation machine learning model may be developed and used to automatically annotate the previous index document objects in particular embodiments. For example, the cross-document annotation machine learning model in some embodiments may be a random forest based model. Such a model may be developed to enable a significant size corpus can be developed for training the entity-document correlation machine learning model and to reduce the number of previous index document objects that need to be manually annotated. In some embodiments, manually-annotated (tagged) previous index document objects describing prior annotative relationships may be processed through a natural language processing pipeline to create features that are used to train the cross-document annotation machine learning model. Once trained, the cross-document annotation machine learning model can then be used to annotate untagged previous index document objects.

Returning now to FIG. 4, once the document prediction engine 415 has identified the subset of related document objects 420 needed by the reviewer, the process 400 continues in particular embodiments with identifying an optimal document sequence 430 for the subset 420 using a document sequence optimization machine learning model 425. Accordingly, the document sequence optimization machine learning model 425 may be configured based on a probabilistic model to predict the optimal sequence of the document objects found in the subset of related document objects 420 identifying the information sources required by the reviewer in adjudicating the incoming case 115. Therefore, the model 425 may generate a set of candidate document sequences for the subset of related document objects 420 and produce a combined sequence probability value for each candidate.

Each candidate document sequence represents a permutation of a different sequential arrangement of the document objects found in the subset and the combined sequence probability value for a candidate document sequence may provide a probability based on a likelihood that the candidate document sequence is an optimal documents sequence. In some embodiments, the combined sequence probability value for a document sequence $D_1 \rightarrow \ldots \rightarrow D_n$ may be determined by performing the operations depicted in Equation 1:

$$P(D_1 \ldots D_n) = \pi_{i=1}^n P(D_i | D_{i-1}, D_{i-2}, \ldots, D_1) = P(D_1) * P(D_2|D_1) * \ldots * P(D_{n-1} | D_{n-2}, \ldots, D_1)$$

Equation 1

Accordingly, in particular embodiments, generating the combined sequence probability value for a candidate document sequence may involve generating an individual occurrence probability for an initial input document object of the subset of related document objects 420 that is associated with a lower-most document ordering value of one or more document sequence ordering values defined by the candidate document sequence. Accordingly, a conditional occurrence probability may then be determined for each document sequence ordering value for occurrence of a post-initial input document object of the set of input document objects that is associated with the current document sequence ordering value following each input document object of the subset of related document objects 420 having a lower document ordering value relative to the current document ordering value.

In some embodiments, the combined sequence probability value for a candidate document sequence is determined based on the pair-wise document sequencing probability for each pair of document objects found in the candidate document sequence. An ordered document pair may be made up of one or more prior document objects and a posterior document object in which pair-wise document sequencing probability describes an estimated probability that the one or more prior document objects in the ordered document pair is immediately followed by the posterior document object in the ordered document pair. In various embodiments, the posterior document object represents one of the document objects found in the candidate document sequence and the one or more prior document objects represent all of the document objects found prior to that document object in the candidate document sequence. However, in some embodiments, a Markov assumption may be used to approximate the set of reference document objects and therefore the one or more prior document objects may represent a smaller number of the document objects found prior to the posterior document object. For instance, n-gram modeling may be used in particular embodiments. In these particular instances, the plurality of pair-wise document sequencing probabilities may be estimated using maximum likelihood estimation.

Accordingly, the document sequence optimization model is configured in various embodiments to select the candidate document sequence with the highest probability value as the optimal document sequence 430 for the subset of related document objects 420. At this point, the document objects found in the subset 420 are processed in the order found in the optimal document sequence 430 to retrieve the information sources associated with the objects and extract out the needed information from each source to construct the case note 150 for reviewer. In some embodiments, the case note 150 is constructed with the information extracted from the sources in the same sequence as the optimal document sequence 430 identified for the subset of related document objects 420. Such a construction enables the reviewer to reference the information in a fashion that allows the reviewer to adjudicate the pre-authorization incoming case 115 in an efficient manner.

Aggregation Module

Figure 6:
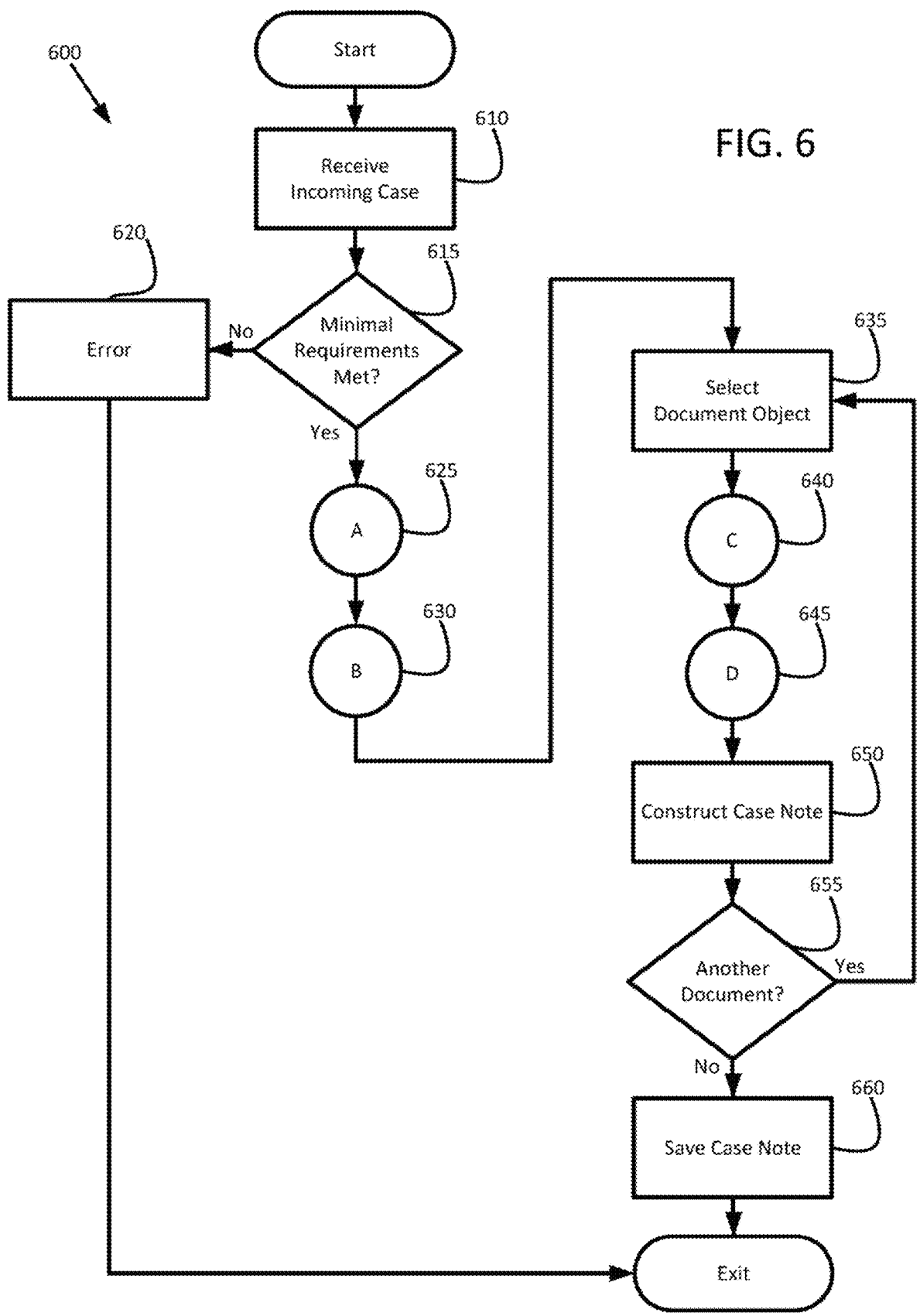
FIG. 6 is a process flow for aggregating information in accordance with various embodiments of the present disclosure.

Turning now to FIG. 6, additional details are provided regarding a process flow for aggregating information from different information sources to produce a case note 150 according to various embodiments. FIG. 6 is a flow diagram showing an aggregation module for performing such functionality according to various embodiments of the disclosure. In some embodiments, the particular process flow 600 shown in FIG. 6 is configured to produce a case note 150 for use by a reviewer in adjudicating a pre-authorization case 115. However, those of ordinary skill in the art should appreciate, in light of this disclosure, that the process flow 600 shown in FIG. 6 can be modified with respect to aggregating information for other applications.

Thus, the process flow 600 begins in various embodiments with the aggregation module receiving the incoming case 115 in Operation 610. As previously noted, the incoming case 115 may be received via one any number of different channels such as through a web portal, sent as a fax, entered through an application on a mobile device, through a direct call from a healthcare provider, and the like. Accordingly, the incoming case 115 is entered into the health insurance provider's system and the aggregation module may be invoked to process the case 115.

Therefore, the aggregation module initially determines whether the incoming case 115 has the minimum required information to enable processing in Operation 615. For example, in particular embodiments, the aggregation module may determine whether the incoming case 115 at least has information identifying the member who is seeking pre-authorization for a medical procedure and/or a medical treatment, information identifying the medical procedure and/or treatment such as CPT and/or diagnosis codes, and information on the facility providing the medical procedure and/or treatment. If not, then the aggregation module sets an error for the incoming case 115 in Operation 620. For example, the aggregation module may place an error message in a log file indicating the incoming case 115 does not have the required minimum information and/or the aggregation module may send an error message to personnel via email or some other source of communication.

However, if the incoming case 115 is determined to have the required minimum information, then the aggregation module generates a subset of related document objects for the incoming case 115 in Operation 625. As previously discussed, a related document object identifies an information source (e.g., a document object) having information needed by the reviewer in conducting the pre-authorization process for the incoming case. In particular embodiments, the aggregation module performs this operation by invoking a document prediction module, such as a document prediction module that uses a cross-document annotation machine learning model. In turn, the document prediction module predicts the subset of related document objects from a set of reference document objects using a machine learning model and returns the subset to the aggregation module. Depending on the embodiment, the document prediction module may return the subset along with a related document sequence defining a reference document ordering value for each related reference document found in the subset.

At this point, the aggregation module in some embodiments identifies an optimal document sequence in Operation 630. In some embodiments, the optimal document sequence may indicate an ordering of the subset of related document objects with respect to the corresponding information sources use by the reviewer during the pre-authorization process. The ordering is "optimized" so that the document objects found in the subset are provided in a particular sequence with respect to when the information sources identified by the objects are needed during the pre-authorization process. Accordingly, the aggregation module performs this operation in particular embodiments by invoking a sequence module and as detailed further herein, the sequence module uses a machine learning model to identify the optimal document sequence.

Next, the aggregation module selects a document object from the subset of related document objects based on the optimal document sequence in Operation 635. The aggregation module then downloads and parses the information for the source identified by the selected document object in Operation 640. The aggregation module performs this operation in various embodiments by invoking a parsing module. As discussed further herein, the parsing module downloads the information from the source identified by the selected document object and parses the information, if needed, to construct a dictionary for the document object having the information for the corresponding source.

Once the information has been downloaded (and parsed if needed), the aggregation module extracts the needed information for conducting the pre-authorization process from the dictionary in Operation 645. In some embodiments, in particular embodiments, the aggregation module performs this particular operation by invoking an extraction module. As discussed further herein, the extraction module in various embodiments tags the information found in the dictionary for the selected document object with respect to different entities (e.g., topics) mentioned in the information and identifies what sections of the information need to be extracted from the dictionary by identifying the appropriate entities based on a knowledge map. The aggregation module then constructs the case note 150 for the incoming case 115 using the extracted information for the selected document object in Operation 650.

At this point, the aggregation module determines whether another document object is found in the subset of related document objects in Operation 655. If so, then the aggregation module returns to Operation 635 and selects the next document object from the subset based on the optimal document sequence and performs the operations just described to extract the information needed for the case note 150 for the newly selected document object. Once all of the document objects found in the subset of related document objects have been processed, the aggregation module saves the case note 150 in Operation 660.

The reviewer may now use the case note 150 generated by the aggregation module for the pre-authorization process. Accordingly, since the aggregation module selected the document objects from the subset of related document objects in an order based on the optimal document sequence, the module has constructed the case note 150 in a sequential manner with the extracted information for each of the document objects in the order needed by the reviewer in adjudicating the case 115. The different modules invoked by embodiments of the aggregation module are now discussed.

Document Prediction Module

Figure 7:
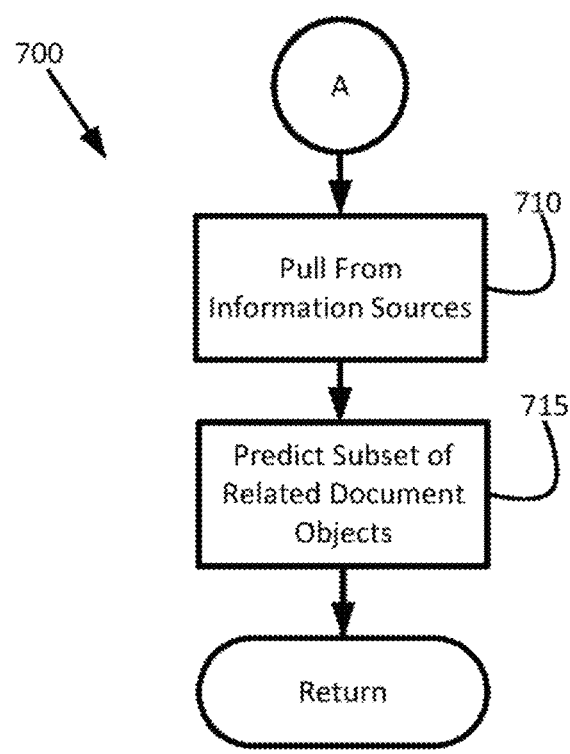
FIG. 7 is a process flow for predicting a subset of related document objects in accordance with various embodiments of the present disclosure.

Turning now to FIG. 7, additional details are provided regarding predicting a subset of related document objects needed for a new incoming case 115 according to various embodiments. FIG. 7 is a flow diagram showing a document prediction module for performing such functionality according to various embodiments of the disclosure. As previously mentioned, the document prediction module may be invoked by another module in particular embodiments to predict the subset of related document objects such as, for example, the aggregation module previously described. However, with that said, the document prediction module may not necessarily be invoked by another module and may execute as a stand-alone module in other embodiments.

The process flow 700 begins with the document prediction module enriching the initial information received for the incoming case 115 by pulling additional information for the case 115 from different information sources in Operation 710. Accordingly, the document prediction module may be configured in particular embodiments to pull in information from various information sources to supplement the case 115. For example, the document prediction module may retrieve clinical information with respect to the medical procedure and/or treatment being sought by the member that may be useful in identifying (predicting) what information may be needed by the reviewer during the pre-authorization process.

The document prediction module then predicts the subset of related document objects for the case 115 in Operation 715. In some embodiments, in particular embodiments, the document prediction module provides entity metadata features found in the enriched information for the case 115 as input to the entity-document correlation machine learning model and in turn, the model provides a probability for each document object found in a set of reference document objects with respect to a likelihood information provided by the information source associated with the object is needed by the reviewer in adjudicating the particular incoming case 115. In some embodiments, the entity metadata features are categorized into three main categories: demographic features; policy-related feature; and diagnosis features. The demographic features may include information that identifies the specific member such as, for example, the member's name, as well as information describing the member such as the member's sex, age, and/or region of the country the member resides. The policy-specific features may include information such as set number, policy number, and the like. The diagnosis features may include information such as CPT codes, diagnosis codes, and the like.

As previously discussed, depending on the embodiment, the entity-document correlation machine learning model may be configured to simply provide the subset of related document objects and/or the model may be configured to provide a related document sequence for the subset of related document objects. The related document sequence defines a related document ordering value for each related document object in the subset of related document objects. As previously discussed, the subset of related document objects can then be used in extracting information from the various sources identified by the document objects found in the subset to construct a case note 150 for the case 115. In addition, the related document sequence can be used in particular instances to construct the case note 150 to provide the information in an order corresponding to the related document sequence.

Sequence Module

Figure 8:
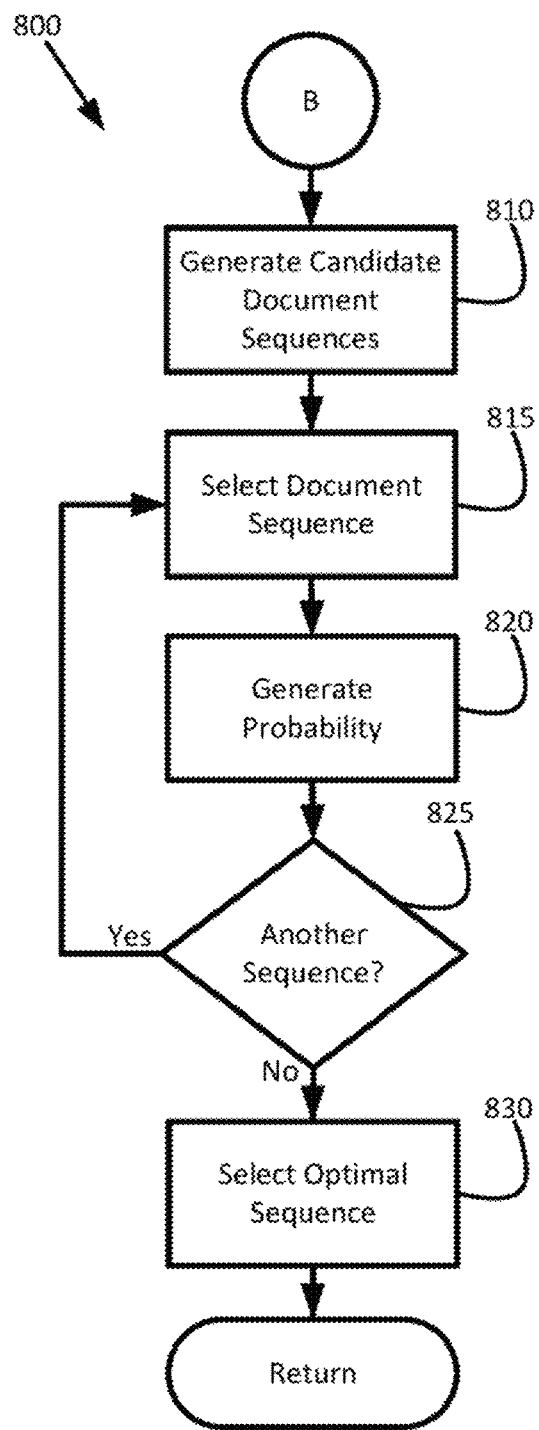
FIG. 8 is a process flow for predicting an optimal document sequence in accordance with various embodiments of the present disclosure.

Turning now to FIG. 8, additional details are provided regarding predicting an optimal document sequence for a subset of related document objects needed for a new incoming case 115 according to various embodiments. FIG. 8 is a flow diagram showing a sequence module for performing such functionality according to various embodiments of the disclosure. As previously mentioned, the sequence module may be invoked by another module in particular embodiments to predict the optimal document sequence such as, for example, the aggregation module previously described. However, with that said, the sequence module may not necessarily be invoked by another module and may execute as a stand-alone module in other embodiments.

The process flow 800 begins with the sequence module generating a set of candidate document sequences for the subset of related document objects in Operation 810. Accordingly, a candidate document sequence may represent a candidate sequential ordering of the document objects found in the subset. For example, the subset of related document objects may include document objects A, B, and C. In this example, the sequence module may generate the candidate document sequences as: (1) A, B, C; (2) A, C, B; (3) B, A, C; (4) B, C, A; (5) C, A, B; and (6) C, B, A.

In particular embodiments, the sequence module may be configured to generate the set of candidate document sequences by scaling down potential candidate document sequences using some type of criteria. For example, information from an information source having state mandates on cancer treatments may always be needed first by a reviewer who is handling a pre-authorization process in which the member is seeking pre-authorization for chemotherapy treatment. Therefore, in this example, the sequence module may be configured to only generate candidate document sequences with the document object for the information source in the first position. While in another example, the sequence module may be configured to use the related document sequence generated by the document prediction module in identifying candidate document sequences. Those of ordinary skill in the art can envision other criteria that may be used in identifying candidate document sequences in light of this disclosure.

Once the set of candidate document sequences has been generated, the sequence module selects one of the candidates in Operation 815 and generates a combined sequence probability value for the candidate using the document sequence optimization machine learning model previously discussed in Operation 820. The combined sequence probability value represents a probability with respect to the likelihood the selected candidate document sequence is the optimal sequential ordering of the document objects for use by the reviewer in adjudicating the incoming case 115.

Accordingly, a set of sequence-related features is provided as input to the document sequence optimization machine learning model that includes the candidate to generate the combined sequence probability value for the candidate. In addition, these features may provide information and/or characteristics on individual document objects found in the subset of related document objects. For example, the features may include a document identifier for each document object (information source) found in the candidate, a document type identifier that identifies a particular document object (information source) as being part of a particular type of document objects such as, for example, various forms for healthcare providers (office visit summaries for members, evaluations based on physicals performed on members, and/or diagnosis notes produced for members), and/or other features for each document object such as a document creation date identifier, a document latest revision date identifier, and the like.

In addition, in particular embodiments, the document sequence optimization machine learning model may be configured to multiply the raw combined sequence probability value with a prior selection bonus to generate the combined sequence probability value for the candidate. In some embodiments, the prior selection bonus may be used to weight the combined sequence probability value for the candidate document sequence based on the candidate being associated with a prior document sequence that was used for one or more past similar incoming cases.

At this point, the segmentation module determines whether there is another candidate document sequence in Operation 825. If so, then the segmentation module returns to Operation 815, selects the next candidate document sequence, and generates the combined sequence probability value for the newly selected candidate. Once the segmentation module has generated the combined sequence probability value for each candidate document sequence, the module selects the candidate with the highest combined sequence probability value as the optimal candidate sequence in Operation 830.

Parsing Module

Figure 9:
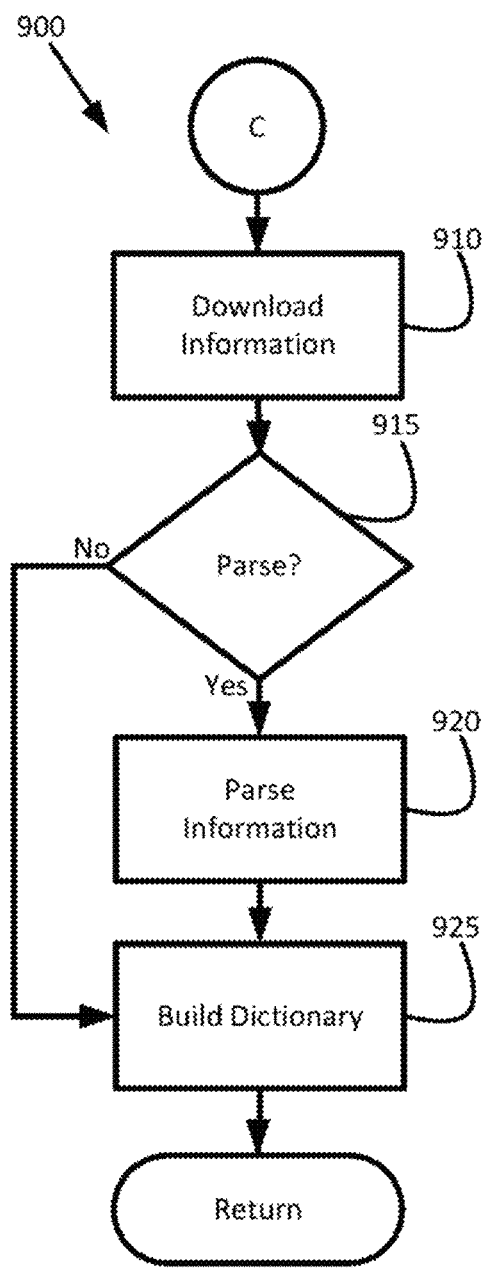
FIG. 9 is a process flow for parsing information downloaded from a document in accordance with various embodiments of the present disclosure.

Turning now to FIG. 9, additional details are provided for parsing information downloaded from an information source according to various embodiments. FIG. 9 is a flow diagram showing a parsing module for performing such functionality according to various embodiments of the disclosure. As previously mentioned, the parsing module may be invoked by another module in particular embodiments to download and parse the information from a source such as, for example, the aggregation module previously described. However, with that said, the parsing module may not necessarily be invoked by another module and may execute as a stand-alone module in other embodiments.

The process flow 900 begins with the parsing module downloading the information for source corresponding to the document object in Operation 910. As previously discussed, information sources may be divided into two different categories. The first category may involve generic sources that may contain information that is not necessarily specific to the member. For example, a generic information source may involve a healthcare mandate or guidelines published by a particular state. In some embodiments, these sources may be downloaded and parsed periodically (e.g., once every week) to capture any changes made to the information provided by the source, and stored as a dictionary in an indexed repository. Therefore, if the document object is for such an information source, then the parsing module simply retrieves the dictionary for the source from the repository. The second category of information sources involve sources that may have information that is specific to the member. For example, a doctor's summary of a visit the member made to the doctor. Therefore, the information for these sources in various embodiments is generally downloaded in real-time during the pre-authorization process.

Once the information for the source has been downloaded, the parsing module determines whether the information needs to be parsed in Operation 915. For example, the parsing module may have downloaded member-specific information in a pdf format from the source and the information found in the pdf may need to be extracted from the pdf. Therefore, if the downloaded information does need to be parsed, the parsing module parses the information in Operation 920.

For instance, in particular embodiments, the parsing module may make use of one more parsers configured to parse specific types of documents. For example, the parsing module may make use of an Optical Charter Recognition (OCR) based parser configured to parse pdf files converted to images. In addition, the parsing module may make use of one or more of an XML based parser, HTML based parser, word processing document based parser, and the like.

The parsing module then builds a dictionary from the information for the document in Operation 925. In some embodiments, in particular embodiments, the parsing module may place indexes within the dictionary in a standard layout to facilitate location of specific information within the dictionary when needed. For example, the dictionary for an information source having text may be indexed according to <headings><subheadings> followed by the information content. While the dictionary for an information source involving a table may be indexed according to <headings><subheadings> <table><row id><column id> with the information content. Accordingly, the dictionary produced for the information source may then be used in constructing the case note 150 for the incoming case 115.

Extraction Module

Figure 10:
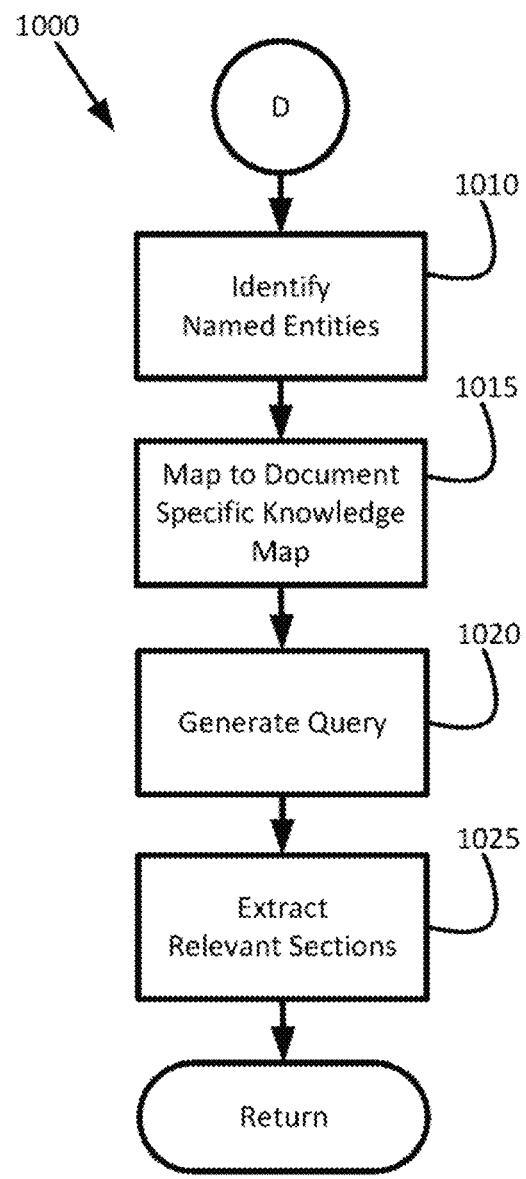
FIG. 10 is a process flow for extracting information needed for a document in accordance with various embodiments of the present disclosure.

Turning now to FIG. 10, additional details are provided for extracting the information needed for a document object according to various embodiments. FIG. 10 is a flow diagram showing an extraction module for performing such functionality according to various embodiments of the disclosure. As previously mentioned, the extraction module may be invoked by another module in particular embodiments to extract the information needed for a document object such as, for example, the aggregation module previously described. However, with that said, the extraction module may not necessarily be invoked by another module and may execute as a stand-alone module in other embodiments.

The process flow 1000 begins with the extraction module processing the dictionary for the document object being through a natural language processing pipeline to extract the named entities found in the dictionary and their corresponding text in Operation 1010. Thus, the extraction module is configured in particular embodiments to perform Named-Entity Recognition (NER) on the dictionary to identify, locate, and classify named entities mentioned in the information found in the dictionary into pre-defined categories. In addition, the extraction module may identify (map) the corresponding information for each entity.

The extraction module then maps the named entities found in the dictionary to a knowledge map in Operation 1015. In various embodiments, a knowledge map is constructed for each of the document objects found in the set of reference documents. In some embodiments, a knowledge map for a document object captures all the different entities (e.g., topics) of interest for the corresponding information source. For instance, a knowledge map for a document object may be an ontology representation and/or a set of rules with respect to the different entities of interest for the corresponding source. Accordingly, these maps may be constructed with the help of experts who are familiar with the corresponding source or type of source along with the previous index document objects that have been annotated.

Figure 11:
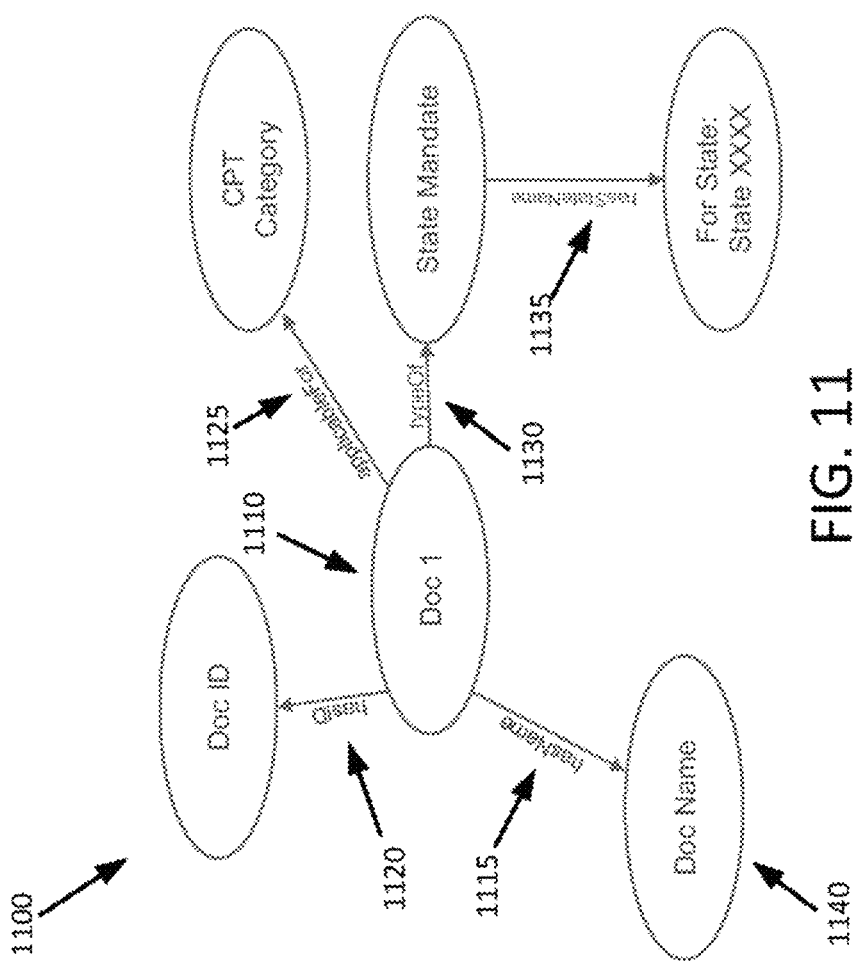
FIG. 11 is an example of a knowledge map that may be used in accordance with various embodiments of the present disclosure.

Turning briefly to FIG. 11, an example knowledge map 1100 is provided for a document object. This particular map 1100 is for document Doc 1 1110 and includes several relationships 1115, 1120, 1125, 1130, 1135 with respect to entities of interest. Each relationship 1115, 1120, 1125, 1130, 1135 is in the form of a triplet whose format is defined as <subject> <relationship> <predicate>. For example, the map 1100 includes a relationship 1115 as the triplet <Doc D1> 1110 <hasName> 1115 <Doc Name> 1140. Accordingly, these relationships 1115, 1120, 1125, 1130, 1135 can be defined with the help of the experts and any two given subjects (e.g., entities of interest) can be combined with a relationship 1115, 1120, 1125, 1130, 1135 to form a triplet.

Therefore returning to FIG. 10, the extraction module can perform an inferencing on the knowledge map to determine the entities for which relevant information should be extracted from the dictionary for the document object. For example, based on policy related to the incoming case 115 and related details on the medical procedure and/or treatment to be received by the member (e.g., CPT codes and/or diagnosis codes), the extraction module may pick the corresponding relationships from the knowledge map. Accordingly, the extraction module parses these relationships to identify the entities of interest.

At this point, in particular embodiments, the extraction module constructs a query based on the identified entities of interest from the knowledge map in Operation 1020. The extraction module then extracts the relevant information from the dictionary for document object based on the query in Operation 1025. As previously discussed, the extracted information is then used in constructing the case note 150 for the particular incoming case 115.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating an optimal document sequence for a set of input document objects, the computer-implemented method comprising:
   for each input document object in the set of input document objects, determining, using one or more processors, a set of sequence-related features;
   processing sets of sequence-related features for the set of input document objects using the one or more processors and a document sequence optimization machine learning model to generate the optimal document sequence, wherein: (a) the document sequence optimization machine learning model is configured to (i) generate a set of candidate document sequences for the set of input document objects, (ii) generate a combined sequence probability value for each candidate document sequence of the set of candidate document sequences, and (iii) select the optimal document sequence from the set of candidate document sequences, and (b) generating the combined sequence probability value for a particular candidate document sequence comprises:

generating, using the one or more processors, an individual occurrence probability for an initial input document object of the set of input documents that is associated with a lower-most document ordering value of one or more document sequence ordering values defined by the candidate document sequence;

for each current document ordering value of the one or more document sequence ordering values other than the lower-most document ordering value, determining, using the one or more processors, a conditional occurrence probability for occurrence of a post-initial input document object of the set of input document objects that is associated with the current document ordering value following each input document object of the set of input document objects having a lower document ordering value relative to the current document ordering value; and generating, using the one or more processors, the combined sequence probability value based at least in part on the individual occurrence probability for the initial input document object and each conditional occurrence probability for a post-initial input document object of the set of input document objects; and performing, using the one or more processors, one or more prediction-based actions based at least in part on the optimal document sequence.

2. The computer-implemented method of claim 1, wherein the set of related sequence-related features for an input document object of the set of input documents comprise a document identifier of the input document object.

3. The computer-implemented method of claim 1, wherein the set of related sequence-related features for an input document object of the set of input documents comprise a document group identifier of the input document object.

4. The computer-implemented method of claim 1, wherein the set of related sequence-related features for an input document object of the set of input documents comprise a document type identifier of the input document object.

5. The computer-implemented method of claim 1, wherein the set of related sequence-related features for an input document object of the set of input documents comprise a document creation date identifier of the input document object.

6. The computer-implemented implemented method of claim 1, wherein the set of related sequence-related features for an input document object of the set of input documents comprise a document latest revision date identifier of the input document object.

7. The computer-implemented method of claim 1, wherein:

the set of related document objects are associated with a prior document sequence; and the document sequence optimization model is configured to generate the combined sequence probability value for a corresponding candidate document sequence of the set of candidate document sequences that corresponds to the prior document sequence by generating a raw combined sequence probability value for the corresponding candidate document sequence and applying a prior selection bonus to the raw combined sequence probability value.

8. An apparatus for generating an optimal document sequence for a set of input document objects, the apparatus comprising at least one processor and at least one non-transitory memory including program code, the at least one non-transitory memory and the program code configured to, with the processor, cause the apparatus to at least:

for each input document object in the set of input document objects, determine a set of sequence-related features;

process sets of sequence-related features for the set of input document objects using a document sequence optimization machine learning model to generate the optimal document sequence, wherein: (a) the document sequence optimization machine learning model is configured to (i) generate a set of candidate document sequences for the set of input document objects, (ii) generate a combined sequence probability value for each candidate document sequence of the set of candidate document sequences, and (iii) select the optimal document sequence from the set of candidate document sequences, and (b) generating the combined sequence probability value for a particular candidate document sequence comprises:

generating an individual occurrence probability for an initial input document object of the set of input documents that is associated with a lower-most document ordering value of one or more document sequence ordering values defined by the candidate document sequence;

for each current document ordering value of the one or more document sequence ordering values other than the lower-most document ordering value, determining a conditional occurrence probability for occurrence of a post-initial input document object of the set of input document objects that is associated with the current document ordering value following each input document object of the set of input document objects having a lower document ordering value relative to the current document ordering value; and generating the combined sequence probability value based at least in part on the individual occurrence probability for the initial input document object and each conditional occurrence probability for a post-initial input document object of the set of input document objects; and perform one or more prediction-based actions based at least in part on the optimal document sequence.

9. The apparatus of claim 8, wherein the set of related sequence-related features for an input document object of the set of input documents comprise a document identifier of the input document object.

10. The apparatus of claim 8, wherein the set of related sequence-related features for an input document object of the set of input documents comprise a document group identifier of the input document object.

11. The apparatus of claim 8, wherein the set of related sequence-related features for an input document object of the set of input documents comprise a document type identifier of the input document object.

12. The apparatus of claim 8, wherein the set of related sequence-related features for an input document object of the set of input documents comprise a document creation date identifier of the input document object.

13. The apparatus of claim 8, wherein the set of related sequence-related features for an input document object of the set of input documents comprise a document latest revision date identifier of the input document object.

14. The apparatus of claim 8, wherein:
the set of related document objects are associated with a prior document sequence; and
the document sequence optimization model is configured to generate the combined sequence probability value for a corresponding candidate document sequence of the set of candidate document sequences that corresponds to the prior document sequence by generating a raw combined sequence probability value for the corresponding candidate document sequence and applying a prior selection bonus to the raw combined sequence probability value.

15. A non-transitory computer storage medium comprising instructions for generating an optimal document sequence for a set of input document objects, the instructions being configured to cause one or more processors to at least perform operations configured to:
for each input document object in the set of input document objects, determine a set of sequence-related features;
process sets of sequence-related features for the set of input document objects using a document sequence optimization machine learning model to generate the optimal document sequence, wherein: (a) the document sequence optimization machine learning model is configured to (i) generate a set of candidate document sequences for the set of input document objects, (ii) generate a combined sequence probability value for each candidate document sequence of the set of candidate document sequences, and (iii) select the optimal document sequence from the set of candidate document sequences, and (b) generating the combined sequence probability value for a particular candidate document sequence comprises:
generating an individual occurrence probability for an initial input document object of the set of input documents that is associated with a lower-most document ordering value of one or more document sequence ordering values defined by the candidate document sequence;
for each current document ordering value of the one or more document sequence ordering values other than the lower-most document ordering value, determining a conditional occurrence probability for occurrence of a post-initial input document object of the set of input document objects that is associated with the current document ordering value following each input document object of the set of input document objects having a lower document ordering value relative to the current document ordering value; and
generating the combined sequence probability value based at least in part on the individual occurrence probability for the initial input document object and each conditional occurrence probability for a post-initial input document object of the set of input document objects; and
perform one or more prediction-based actions based at least in part on the optimal document sequence.

16. The non-transitory computer storage medium of claim 15, wherein the set of related sequence-related features for an input document object of the set of input documents comprise a document identifier of the input document object.

17. The non-transitory computer storage medium of claim 15, wherein:
the set of related document objects are associated with a prior document sequence; and
the document sequence optimization model is configured to generate the combined sequence probability value for a corresponding candidate document sequence of the set of candidate document sequences that corresponds to the prior document sequence by generating a raw combined sequence probability value for the corresponding candidate document sequence and applying a prior selection bonus to the raw combined sequence probability value.

18. The non-transitory computer storage medium of claim 15, wherein the set of related sequence-related features for an input document object of the set of input documents comprise a document group identifier of the input document object.

19. The non-transitory computer storage medium of claim 15, wherein the set of related sequence-related features for an input document object of the set of input documents comprise a document type identifier of the input document object.

20. The non-transitory computer storage medium of claim 15, wherein the set of related sequence-related features for an input document object of the set of input documents comprise a document creation date identifier of the input document object.

* * * * *